(12) United States Patent
Wong et al.

(10) Patent No.: US 12,082,206 B2
(45) Date of Patent: Sep. 3, 2024

(54) COMMUNICATIONS SYSTEM AND ASSOCIATED DEVICES FOR PERFORMING COMMUNICATION USING CONTROL CHANNELS OF DIFFERENT REPETITION RATES

(71) Applicant: Sony Corporation, Tokyo (JP)

(72) Inventors: Shin Horng Wong, Basingstoke (GB); Martin Warwick Beale, Basingstoke (GB); Kazuyuki Shimezawa, Basingstoke (GB); Yassin Aden Awad, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 745 days.

(21) Appl. No.: 17/260,551

(22) PCT Filed: Jul. 19, 2019

(86) PCT No.: PCT/EP2019/069530
§ 371 (c)(1),
(2) Date: Jan. 15, 2021

(87) PCT Pub. No.: WO2020/020780
PCT Pub. Date: Jan. 30, 2020

(65) Prior Publication Data
US 2021/0282123 A1 Sep. 9, 2021

(30) Foreign Application Priority Data
Jul. 25, 2018 (EP) .................................. 18185543

(51) Int. Cl.
*H04W 72/23* (2023.01)
*H04L 1/08* (2006.01)

(52) U.S. Cl.
CPC ............... *H04W 72/23* (2023.01); *H04L 1/08* (2013.01)

(58) Field of Classification Search
CPC .................................. H04W 72/23; H04L 1/08
See application file for complete search history.

(56) References Cited

U.S. PATENT DOCUMENTS

| 2011/0002282 A1* | 1/2011 | Inoue | H04L 5/0037 370/329 |
| 2011/0201341 A1* | 8/2011 | Choudhury | H04W 72/27 455/450 |

(Continued)

FOREIGN PATENT DOCUMENTS

EP 3313121 A1 4/2018

OTHER PUBLICATIONS

International Search Report and Written Opinion mailed on Oct. 11, 2019, received for PCT Application PCT/EP2019/069530, Filed on Jul. 19, 2019, 10 pages.

(Continued)

*Primary Examiner* — Tejis Daya
(74) *Attorney, Agent, or Firm* — XSENSUS LLP

(57) ABSTRACT

A base station for a mobile telecommunications system has circuitry configured to communicate with at least one user equipment, wherein the circuitry is further configured to: provide, to the at least one user equipment, control channel candidates at different repetition levels, wherein at least a first control channel candidate of a repetition level overlaps in time with at least a second control channel candidate of the same repetition level.

19 Claims, 7 Drawing Sheets

(56) References Cited

U.S. PATENT DOCUMENTS

| | | | | |
|---|---|---|---|---|
| 2016/0330633 A1* | 11/2016 | You | ........................ | H04W 16/26 |
| 2016/0353440 A1* | 12/2016 | Lee | .................... | H04W 72/0453 |
| 2017/0013626 A1* | 1/2017 | Nan | ...................... | H04L 1/1854 |
| 2018/0084561 A1* | 3/2018 | Liu | ............................ | H04L 1/00 |
| 2018/0139024 A1* | 5/2018 | Shi | .......................... | H04W 4/70 |
| 2018/0176806 A1* | 6/2018 | Suzuki | .................. | H04L 5/0055 |
| 2018/0206290 A1* | 7/2018 | Dai | ........................ | H04W 52/50 |
| 2018/0310283 A1* | 10/2018 | Deenoo | ................. | H04W 72/23 |
| 2018/0317198 A1* | 11/2018 | Lee | ........................ | H04W 76/28 |
| 2019/0053212 A1* | 2/2019 | Liu | ........................ | H04L 5/0091 |
| 2019/0239160 A1* | 8/2019 | Lee | .................... | H04W 52/0216 |
| 2019/0380112 A1* | 12/2019 | Lee | ........................ | H04L 1/1887 |
| 2020/0404669 A1* | 12/2020 | Seo | ...................... | H04L 25/0238 |

OTHER PUBLICATIONS

Sequans Communications, "On PDCCH Repetition for NR URLLC", 3GPP TSG RAN WG1 Meeting #93, R1-1806958, May 21-25, 2018, 6 pages.

Sony, "Remaining Issues in Explicit Uplink HARQ-ACK Feedback", 3GPP TSG RAN WG1 Meeting #93, R1-1807245, May 21-25, 2018, 6 pages.

NTT Docomo, Inc., "Revised WID on New Radio Access Technology", 3GPP TSG RAN, Meeting #78, RP-172834, Lisbon Portugal, Dec. 18-21, 2017, 11 pages.

ETS1 TR 138 913, "5G; Study on Scenarios and Requirements for Next Generation Access Technologies", 3GPP TR 38.913 Version 14.2.0 Release 14, May 2017, 41 pages.

* cited by examiner

COMMUNICATIONS SYSTEM AND ASSOCIATED DEVICES FOR PERFORMING COMMUNICATION USING CONTROL CHANNELS OF DIFFERENT REPETITION RATES

CROSS-REFERENCE TO RELATED APPLICATIONS

The present application is based on PCT filing PCT/EP2019/069530, filed Jul. 19, 2019, which claims priority to EP 18185543.8, filed Jul. 25, 2018, the entire contents of each are incorporated herein by reference.

TECHNICAL FIELD

The present disclosure generally pertains to base stations, user equipment, circuitries and methods for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems. An NR can be based on LTE technology, just as some aspect of LTE was based on previous generations of mobile communications technology.

The 3GPP Rel-15 New Radio (NR) Access Technology Work Item, whose objectives are defined in RP-172834, "Work Item on New Radio (NR) Access Technology," NTT DOCOMO, RAN #78, Lisbon, Portugal, Dec. 18-21, 2017, specifies the $5^{th}$ generation or 5G radio access network, and specifies two NR functionalities, namely:

Enhanced Mobile Broadband (eMBB), and
Ultra Reliable & Low Latency Communications (URLLC), wherein eMBB services are characterized by high capacity with a requirement to support up to 20 Gb/s. For efficient transmission of large amounts of data at high throughput, eMBB requires a long scheduling time so as to minimize the overhead used (where the "scheduling time" we refer to is the time to allocate and transmit a data packet). The URLLC data may be short and hence a short scheduling time where the control and data have short duration are required within a frame duration that is significantly less than that of the eMBB frame.

Moreover, according to 3GPP document ETSI TR 138 913, V14.2.0 (2017-05), "3G; Study on Scenarios and Requirements for Next Generation Access Technologies (3GPP TR 38.913 version 14.2.0 Release 14)", two important requirements for URLLC are:

Low latency: The required latency measured from the ingress of a layer 2 packet to its egress from the network, is at most 1 ms.

Reliability: The requirement for URLLC is a reliability of $1\text{-}10^{-5}$ (99.999%) for one transmission of a 32 byte packet.

Generally, it is known to pre-empt resources of an ongoing transmission, such as eMBB, such that pre-empted resources can be used for low latency transmission such as URLLC.

Furthermore, it is envisaged that control channels such as PDCCH (Physical Downlink Control Channel) and PUCCH (Physical Uplink Control Channel) carry scheduling and feedback information for URLLC transmission.

Although there exist techniques for transmission of scheduling information for URLLC transmission, it is generally desirable to improve the existing techniques.

SUMMARY

According to a first aspect, the disclosure provides a base station for a mobile telecommunications system comprising circuitry configured to communicate with at least one user equipment, wherein the circuitry is further configured to provide, to the at least one user equipment, control channel candidates at different repetition levels, wherein at least a first control channel candidate of a repetition level overlaps in time with at least a second control channel candidate of the same repetition level.

According to a second aspect, the disclosure provides a user equipment for a mobile telecommunications system comprising circuitry configured to communicate with at least one base station, wherein the circuitry is further configured to receive, from the at least one base station, at least one control channel from control channel candidates at different repetition levels, wherein at least a first control channel candidate of a repetition level overlaps in time with at least a second control channel candidate of the same repetition level.

According to a third aspect, the disclosure provides a circuitry for a mobile telecommunications system configured to communicate with at least another circuitry, wherein the circuitry is further configured to provide, to the at least another circuitry, control channel candidates at different repetition levels, wherein at least a first control channel candidate of a repetition level overlaps in time with at least a second control channel candidate of the same repetition level, or receive, from the at least another circuitry, at least one control channel from control channel candidates at different repetition levels, wherein at least a first control channel candidate of a repetition level overlaps in time with at least a second control channel candidate of the same repetition level.

According to a fourth aspect, the disclosure provides a mobile telecommunications system method for providing communication between at least one base station and at least one user equipment, comprising providing, to the at least one user equipment, control channel candidates at different repetition levels, wherein at least a first control channel candidate of a repetition level overlaps in time with at least a second control channel candidate of the same repetition level, or receiving, from the at least one base station, at least one control channel from control channel candidates at different repetition levels, wherein at least a first control channel candidate of a repetition level overlaps in time with at least a second control channel candidate of the same repetition level.

According to a fifth aspect, the disclosure provides a mobile telecommunications system configured to provide communication between at least one base station and at least one user equipment, wherein the at last one base station, according to the first aspect, comprises circuitry configured to provide, to the at least one user equipment, control channel candidates at different repetition levels, wherein at least a first control channel candidate of a repetition level overlaps in time with at least a second control channel candidate of the same repetition level, and wherein the at least one user equipment, according to the second aspect, comprises circuitry configured to receive, from the at least one base station, at least one control channel from control channel candidates at different repetition levels, wherein at least a first control channel candidate of a repetition level overlaps in time with at least a second control channel candidate of the same repetition level.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 6:
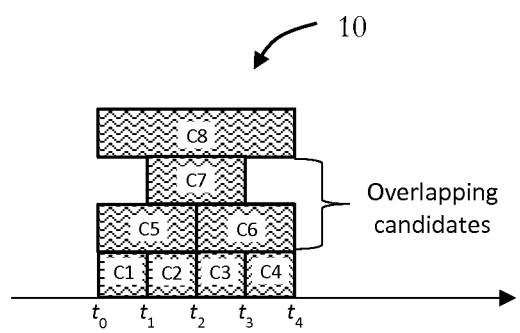
FIG. 6 illustrates an embodiment of control channel candidates overlapping in time.

Before a detailed description of the embodiments under reference of FIG. 6 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

One of the candidates for meeting the 5G requirements are termed New Radio (NR) Access Technology Systems. Some aspects of NR can be based on LTE technology, in some embodiments, just as some aspects of LTE were based on previous generations of mobile communications technology.

As mentioned in the outset, two new functionalities for the New Radio (NR) Access Technology, which are discussed, are Enhanced Mobile Broadband (eMBB) and Ultra Reliable & Low Latency Communications (URLLC) services.

Figure 1:
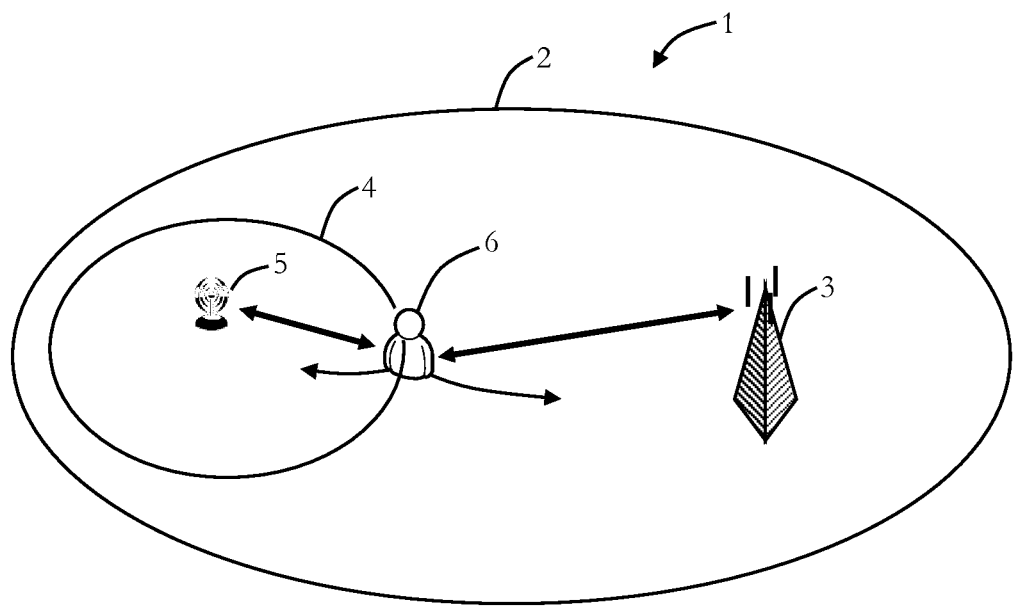
FIG. 1 illustrates an embodiment of a radio access network.

A typical embodiment of an NR radio network RAN 1 is illustrated in FIG. 1. The RAN 1 has a macro cell 2, which is established by an LTE eNodeB 3, and an NR cell 4, which is established by an NR eNodeB 5 (also referred to as gNB (next generation eNodeB)).

A UE 6 can communicate with the LTE eNodeB 3 and, as long as it is within the NR cell 4, it can also communicate with the NR eNodeB 5.

As mentioned, eMBB services are characterized in some embodiments by high capacity with a requirement to support up to 20 Gb/s. For efficient transmission of large amounts of data at high throughput, eMBB requires a long scheduling time so as to minimize the overhead used (wherein, in some embodiments, the "scheduling time" is the time to allocate and transmit a data packet).

In some embodiments, as mentioned, a requirement for URLLC is low latency measured from the ingress of a layer 2 packet to its egress from the network, with an exemplary target of 1 ms, without limiting the present disclosure in that regard, and another requirement for URLLC is a reliability of $1\text{-}10^{-5}$ (99.999%) for one transmission of a 32 byte packet. The URLLC data may be short and hence a short scheduling time where the control and data have short duration are required in some embodiments within a frame duration that is significantly less than that of the eMBB frame.

In some embodiments, the reliability aspect of URLLC is addressed through the use of LDPC codes (Low Density Parity Check codes), low coding rates (with low spectral efficiency), high aggregation levels for control channels and the support of multiple antennas at both the transmitter and receiver. Introduction of a new CQI table (Channel Quality Indicator), having entries with low spectral efficiency, allows URLLC to operate in a spectrally efficient manner, where the scheduled modulation and coding scheme (MCS) can be chosen to meet the reliability criteria in the current channel conditions.

Figure 2:
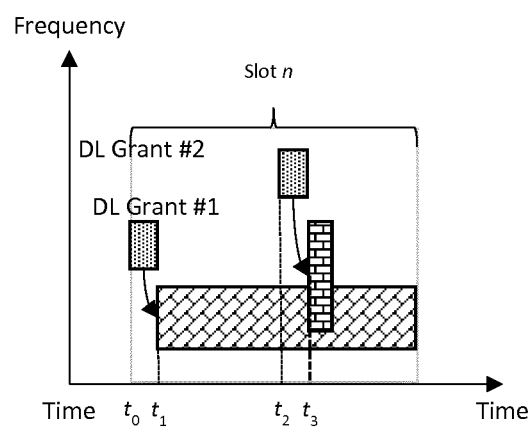
FIG. 2 illustrates pre-emption of an eMBB transmission by a URLLC transmission.

Another aspect, in some embodiments, of URLLC operation for a UE is that the URLLC transmission may pre-empt an existing transmission, in particular if the ongoing transmission is of lower priority, e.g. an enhanced Mobile Broadband (eMBB) transmission that is typically more delay tolerant than a URLLC transmission. Such a pre-emption may occur within or for the same UE. An example is illustrated in FIG. 2, where at time to (abscissa, ordinate shows frequency) in a Slot n, the gNB (5, see exemplary FIG. 1) transmits a DCI (Downlink Control Information) carrying a DL Grant #1 to schedule a PDSCH (Physical Downlink Share Channel) for an eMBB transmission at time $t_1$. At time $t_2$, a URLLC packet arrives for another UE and since it has a low latency, the gNB transmits a DL Grant #2 to schedule another PDSCH for this URLLC transmission at time $t_3$ in the same slot, i.e. Slot n. In this case, there are not sufficient resources available and, thus, the gNB schedules the URLLC transmission to occupy some of the resources originally scheduled for the eMBB transmission, which started at time $t_1$, thereby pre-empting this eMBB transmission.

In some embodiments, the physical channels involved in the transmission of URLLC may be enhanced to ensure that the URLLC requirements are met. It has been recognized that apart from improving the reliability and latency for the data channels, such as PDSCH (Physical Downlink Share Channel) and PUSCH (Physical Uplink Share Channel), that carry the URLLC packet, the control channels such as PDCCH (Physical Downlink Control Channel) and PUCCH (Physical Uplink Control Channel) that carry the scheduling and feedback for URLLC transmission also need to be improved.

In some embodiments, the PDCCH (Physical Downlink Control Channel) carries the DCI (Downlink Control Information), which provides Downlink or Uplink grants that are used to schedule resources for PDSCH or PUSCH that, in turn, carry the URLLC packet. In some embodiments, methods for improving the reliability of the PDCCH include: Compact DCI: Reduce the size of the DCI used for scheduling URLLC resources, i.e. the UL and DL grants. The rationale is that a reduced DCI size can be carried more reliably by using the same amount of resources.

Higher Aggregation Levels: A CCE (Control Channel Element) is a building block for PDCCH and it contains resources capable of carrying the information bits for the DCI. A PDCCH may consist of or include one or multiple CCE(s), wherein an Aggregation Level (AL) of the PDCCH is the number of CCEs used in the PDCCH, which can be viewed as the number of times the DCI information is repeated within a PDCCH. Since higher AL uses more CCEs (i.e. resources) to carry a DCI (at least in some embodiments), higher AL also leads to higher reliability. Hence, in some embodiments, the AL of the PDCCH scheduling URLLC packets is increased and, thus, in some embodiments, the AL of the PDCCH scheduling URLLC packets is increased.

Repetitions: Repetitions of PDCCH in the time or frequency domain increase its reliability. Repetition is implemented in some embodiments.

Figure 3:
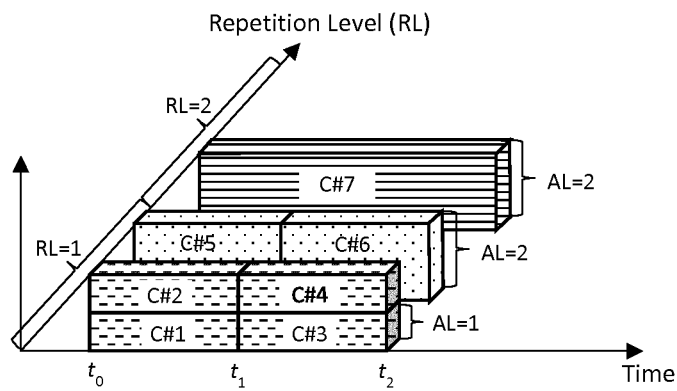
FIG. 3 illustrates a search space with seven control channel candidates.

In some embodiments, repetition of a physical channel is the main mechanism used in eMTC (enhanced Machine-Type-Communication) and NB-IoT (narrow band internet of things) to achieve coverage enhancement where the signal energy of the physical channel is accumulated at the receiver over multiple samples (i.e. repetitions) so that the SNR (signal-to-noise ratio) is increased to a level that is sufficient for the receiver to decode a message. In eMTC and NB-IoT, the number of repetitions of the PDCCH (known as MPDCCH for eMTC and NPDCCH for NB-IoT) is a characteristic of the PDCCH candidate, that is, a PDCCH candidate, in some embodiments, consists of or includes the AL, its location within the frequency domain, its location within the time domain and the number of repetitions of the PDCCH. In some embodiments, the set of PDCCH candidates forms a (control channel) search space. An example of a search space for MPDCCH is shown in FIG. 3, which has three axes, an ordinate showing the frequency, an abscissa showing the time t and a third axis showing the Repetition Level RL (or number of repetitions). In this example, two Repetition Levels are illustrated, namely, RL=1 where MPDCCH is transmitted once (1× repetition) and RL=2 where MPDCCH is repeated twice (2× repetition). There are also two Aggregation Levels (AL), i.e. AL=1 and AL=2.

While it is depicted that candidates (e.g. C #1 and C #2) are orthogonal in the frequency domain, a skilled artisan will appreciate that C #1 and C #2 may simply occupy orthogonal sets of resource elements in the time-frequency grid, without being strictly orthogonal in the frequency domain. The MPDCCH candidates are arranged in a 3D plot as shown in FIG. 3, where candidates {C #1, C #2, C #3, C #4} have AL=1 and RL=1, where candidates {C #1, C #2} occupy time $t_0$ to $t_1$ whilst candidates {C #3, C #4} occupy time $t_1$ to $t_2$. Candidates {C #5, C #6} have AL=2 and RL=1, where C #5 occupies time $t_0$ to $t_1$ whilst C #6 occupies time $t_1$ to $t_2$. Finally candidate C #7 has AL=2 and RL=2 and occupies time $t_0$ to $t_2$. The eNB would transmit the MPDCCH in some embodiments using one of these seven candidates, but the UE does not know which candidate the eNB uses and hence has to blind decode for all the candidates.

Figure 4:
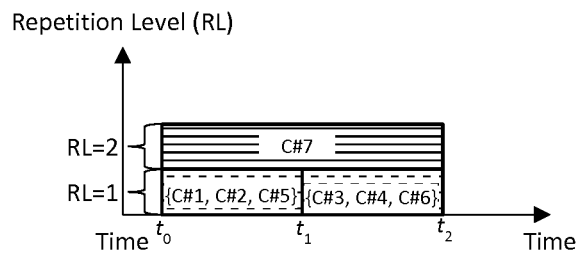
FIG. 4 illustrates a two dimensional representation of the search space illustrated in FIG. 3.

The PDCCH (or NPDCCH/MPDCCH) search space may typically be represented in 2D, for example by removing the Frequency (AL) axis, when the time component of the search space is of interest, which is usually the case when a discussion is focused on repetitions. Such a 2D representation with only the Repetition Level and Time axes corresponding to the 3D representation of the seven NPDCCH candidate search space of FIG. 3 with the Frequency (AL) axis removed is shown for illustration purposes in FIG. 4. In some cases the Repetition Level axis is not required, since the RL can be derived from the time axis, e.g. candidate C #7 is twice as long as the candidates C #1, C #2, C #5. In the following description, such a 2D representation of the PDCCH search space is used, without the RL axis.

Figure 5:
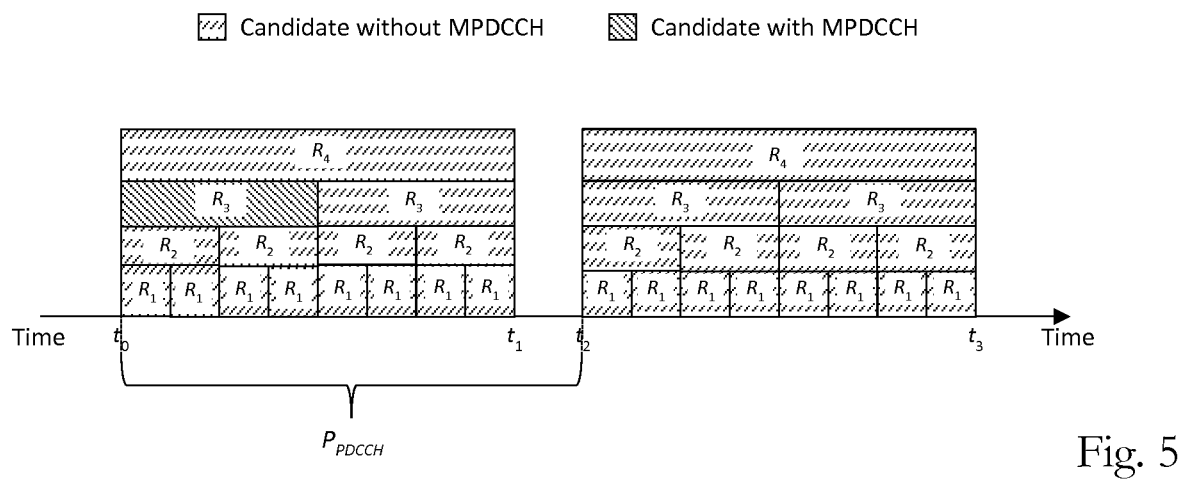
FIG. 5 illustrates a periodicity of search spaces.

In some embodiments, the PDCCH/NPDCCH/MPDCCH search space is monitored by the UE periodically. An example is shown in FIG. 5, where the MPDCCH search space has four Repetition Levels and a periodicity of $P_{PDCCH}$ (lasting from $t_0$ until $t_2$). In FIG. 5, at a first RL (lower series of blocks $R_1$) eight MPDCCH candidates are provided, at a second RI, four MPDCCH candidates $R_2$ are provided, at a third RL, two MPDCCH candidates $R_3$ are provided and at a fourth RL one MPDCCH candidate $R_4$ is provided. For eMTC, in some embodiments, the UE does not perform simultaneous transmissions of multiple PUSCHs and simultaneous reception of multiple PDSCHs. Hence, in this case, within a search space period, the UE can expect an UL grant and/or a DL grant. Referring to the example of FIG. 5, if a DL grant is transmitted to the UE using an MPDCCH with RL=$R_3$ at time to, the eNB cannot transmit another DL grant until the next monitoring period at time $t_2$ using one of the MPDCCH candidates in that search space. This is acceptable, in some embodiments, for eMTC and NB-IoT operations, since the services carried by them are delay tolerant. In contrast to this, URLLC services require low latency and the use of repetitions to improve reliability may lead to delays in some embodiments. Therefore, although PDCCH repetition operation is well defined in existing systems such as eMTC and NB-IoT, the low latency nature and pre-empting feature of URLLC requires a different type of repetitive PDCCH operation in some embodiments.

Thus, some embodiments pertain to a (circuitry for a) base station for a mobile telecommunications system including circuitry configured to communicate with at least one user equipment, wherein the circuitry is further configured to provide, to the at least one user equipment, control channel candidates at different repetition levels, wherein at least a first control channel candidate of a repetition level overlaps in time with at least a second control channel candidate of the same repetition level.

Some embodiments pertain to a (circuitry for a) user equipment for a mobile telecommunications system including circuitry configured to communicate with at least one base station, wherein the circuitry is further configured to receive, from the at least one base station, at least one control channel from control channel candidates at different repetition levels, wherein at least a first control channel candidate of a repetition level overlaps in time with at least a second control channel candidate of the same repetition level.

In this specification, an eMBB transmission is an example for a "long data transmission" (or "long term transmission") and a URLLC transmission is an example for a "short data transmission" (or "short term transmission").

The base station may be based on the principles of LTE (LTE-A) and/or it may be based on NR RAT, as also discussed above. The base station may be based on the known eNodeB of LTE, as one example, or it may be based on the discussed NR gNodeB. The user equipment may be, for example, a mobile phone, smartphone, a computer, tablet, tablet personal computer, or the like, including a mobile communication interface, or any other device which is able to perform a mobile telecommunication via, for example, LTE or NR, such as a hot spot device with a mobile communication interface, etc.

The control channels may be PDCCH (physical downlink control channel) channels and they may be used for indicating a DL or UL grant, wherein a grant for a PDSCH or PUSCH may be based on at least one of the received control channels.

A control channel, such as a PDCCH, may be a physical control channel that is actually transmitted by the network (e.g. the base station) and it may contain DCI (downlink control information.

A control channel candidate, such as a PDCCH candidate, may identify or correspond to known frequency and time resources that the UE monitors for a potential PDCCH transmission. Hence, a control channel candidate (e.g. PDCCH candidate), may or may not contain a control channel (e.g. PDCCH).

Hence, a control channel may be associated with a control channel candidate, wherein the control channel candidates may be part of a control channel search space. The network (base station) provides the control channel candidates to the user equipment, e.g. it configures the user equipment with a control channel search space including the control channel candidates and the user equipment blind decodes the different control channel candidates, wherein one of the control channel candidates are potential instances of the control channel. Hence, the control channels may be associated with a set of control channel candidates (e.g. forming the control channel search space) and, thus, the UE (its circuitry) may be configured to receive (and e.g. decode) control channels, according to a set of control channel candidates.

In some embodiments, the control channel search space, such as a PDCCH search space, is or includes a collection of different control channel (e.g. PDCCH) candidates. The network may select one PDCCH candidate to carry a PDCCH transmission to a UE. But, in some embodiments, the UE does not know which PDCCH candidate the network selected (if any at all) and hence would blind decode all the control channel candidates (e.g. of a control channel search space).

In some embodiments, typically the network would transmit one PDCCH using one of the PDCCH candidates to a UE. It can use another candidate to transmit another PDCCH to another UE at the same time but not to the same UE. If a candidate is used, that resource occupied by that candidate cannot be used for another PDCCH transmission.

As discussed, control channel candidates may be have different repetition levels, i.e. they may have a predefined repetition. Furthermore, the control channel candidates may have different aggregation levels as also discussed above and will be discussed further below.

At least one control channel candidate (of the multiple control channel candidates) of a repetition level overlaps in time with another control channel candidate of the same repetition level.

As discussed, time overlapping control channel candidates having the same repetition level may be associated with the same control channel search space. As discussed also above, in some embodiments, a control channel search space is predefined in which the user equipment searches for control channels e.g. from a set of control channel candidates.

In other embodiments, time overlapping control channel candidates having the same repetition level are associated with different control channel search spaces.

In some embodiments, a starting time for at least one control channel (candidate) of the control channel candidates is explicitly indicated. Thereby, the user equipment may directly process such an indicated control channel, thereby, for example, reducing ambiguity of which control channel (e.g. of the set of control channel candidates) was transmitted, and the like.

In some embodiments, the circuitry is further configured to transmit or receive a starting time indicator for at least one control channel of the control channel candidates, wherein the starting time indicator may be transmitted (received) in downlink control information.

In some embodiments, a starting time for at least one control channel of the control channel candidates is implicitly indicated, e.g. a Radio Network Temporary Identifier (RNTI) implicitly indicates the starting time, wherein different radio network temporary identifiers implicitly indicate different starting times for different control channels.

In some embodiments, frequency and time resources are indicated, which are used by a control channel, wherein the indication is based on a resource indication value for the control channel. This may reduce the ambiguity of which control channel candidate was transmitted.

In some embodiments, a third control channel candidate is associated with a first control channel transmission (e.g. one that schedules a long term/data transmission) for a user equipment and a fourth control channel candidate is associated with a second control channel transmission (e.g. one that schedules a short term/data transmission) for the user equipment, wherein the second 1s transmission associated with the fourth control channel candidate pre-empts the first transmission.

In some embodiments, the second control channel transmission associated with the fourth control channel candidate is transmitted (received) after the first control channel transmission associated with the third control channel candidate. In such cases, the user equipment may only process the later granted transmission, i.e. the short data transmission (associated with the fourth control channel), and may cancel the firstly granted transmission, i.e. the long data transmission (associated with the third control channel).

In some embodiments, a priority is indicated for a control channel associated with a control channel candidates. The priority may indicate which one of a control channel candidate has a higher priority than another one of the control channel candidates, such that, e.g. a transmission received over a control channel candidate having a lower priority has a lower priority than a transmission received over a control channel having a higher priority. The priority may be included in downlink control information or the priority may be indicated based on a radio network temporary identifier. Hence, the user equipment may only process control channels and/or the associated transmission coming from the highest priority (e.g. short data transmissions) control channel candidate or it may process according to the priority order when it is determined that multiple control channel candidates carry control channel transmissions with different priorities. For instance, in the case of a collision of a control channel for which a priority is indicated which is higher than the priority indicated for another control channel, then the user equipment may only decode the transmission carried by the control channel for which the higher priority is indicated. Moreover, as mentioned, control channel candidates may or may not be used by the network for transmission of a control channel (PDCCH).

The UE does not know which candidate the network decides to use for the PDCCH transmission and, thus, it blind decodes all of them. In this embodiment, the network may transmit PDCCHs on more than one candidate, e.g. it transmitted on a first control channel candidate but decided then to use another control channel candidate instead (and abandoned the first transmission). The UE may have managed to decode both transmissions and, thus, it rejects the transmission that comes from the lower priority control channel candidate (which has been abandoned).

In some embodiments, control channel candidates have predetermined priorities, thereby giving priorities to the control channel carried by these control channel candidates. When a collision between a low(er) priority and a high(er) priority control channel occurs, the user equipment may (will) select the PDCCH (and process the associated transmission) which is associated with the control channel candidate having the highest priority. Hence, the user equipment may process all control channel candidates and in the case of a detected conflict (e.g. collision) in a received PDCCH, it chooses the PDCCH associated with the candidate having the highest priority (or it chooses the PDCCHs in the order of the priorities of the associated candidates).

In some embodiments, control channel search spaces have predetermined priorities or control channel search spaces are radio resource control configured. Here, the user equipment may only process control channels and the associated transmission of the search space having the highest priority (e.g. short data transmissions) (when collision occurs) or it may process according the priority order of the search spaces.

In some embodiments, a control channel search space is larger in a time direction than a maximum length (e.g. duration or repetition) of the control channel candidate in the search space. Here, the control channel search space may be increased compared to known search spaces which typically are only as large as a maximum length of a control channel candidate.

In some embodiments, at least two occurrences of a control channel search space are arranged adjacent to each other in a time direction, wherein at least one of the control channel candidates in the first occurrence of the control channel search space overlaps the starting time of the second occurrence of the control channel search space. Hence, at least two control channel search spaces may be arranged adjacent to each other in a time direction, wherein the first control channel search space includes the first control channel candidate and the second control channel search space includes the second control channel candidate, such that the at least two control channel search spaces also overlap (partially) in time. Thereby, different control channel search spaces may be arranged in a way such that no empty time interval without any control channel is present between the at least two adjacent control channel search spaces.

In some embodiments, the number of aggregation levels is indirectly proportional to the number of repetitions of control channel candidates, such that the number of aggregation levels is reduced in the case that the number or repetitions is increased and vice versa.

The features discussed in connection with the base station and/or user equipment can also be realized as a mobile telecommunications system method, and, thus, some embodiments pertain to mobile telecommunications system method for providing communication between at least one base station (as described herein) and at least one user equipment (as described herein), including providing, to the at least one user equipment, control channel candidates at different repetition levels, wherein at least a first control channel candidate of a repetition level overlaps in time with at least a second control channel candidate of the same repetition level, and/or receiving, from the at least one base station, at least one control channel from control channel candidates at different repetition levels, wherein at least a first control channel candidate of a repetition level overlaps in time with at least a second control channel candidate of the same repetition level.

Some embodiments pertain to a mobile telecommunications system configured to provide communication between at least one base station and at least one user equipment, wherein the at last one base station, as discussed herein, comprises circuitry configured to provide, to the at least one user equipment, control channel candidates at different repetition levels, wherein at least a first control channel candidate of a repetition level overlaps in time with at least a second control channel candidate of the same repetition level, and wherein the at least one user equipment, as described herein, comprises circuitry configured to receive, from the at least one base station, at least one control channel from control channel candidates at different repetition levels, wherein at least a first control channel candidate of a repetition level overlaps in time with at least a second control channel candidate of the same repetition level.

Returning back to FIG. 6, an illustration of some of the embodiments is provided. The figure shows allowing PDCCH candidates with the same repetition level to overlap in time within a PDCCH search space 10. As can be taken from FIG. 6, there are eight PDCCH candidates in the PDCCH search space 10, wherein candidates {C1, C2, C3, C4} have no repetition (i.e. transmitted once) and start consecutively at times $t_0$, $t_1$, $t_2$ and $t_3$, candidates {C5, C6, C7} have 2× repetitions and candidate C8 has 4× repetitions. Here, the candidate C7 overlaps in time with candidates C5 and C6, wherein candidate C7 starts at time $t_1$ and ends at time $t_3$ such that the candidate C7 overlaps the transition between C5 to C6 at time $t_2$.

Figure 7:
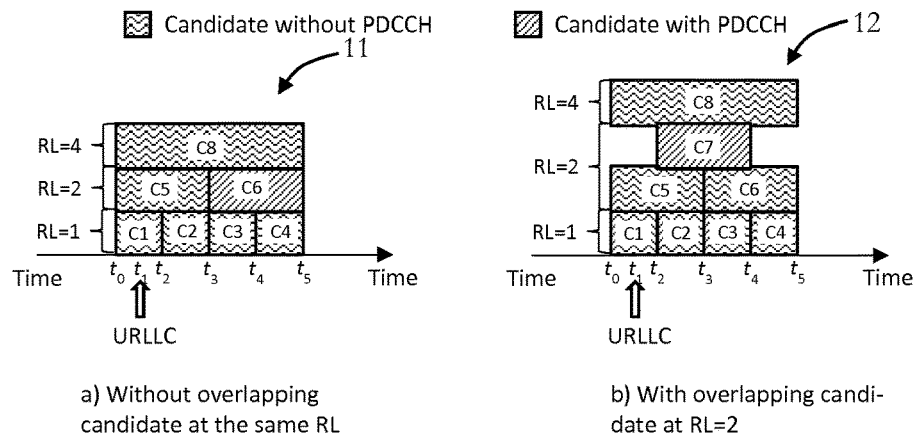
FIG. 7 further illustrates an embodiment of control channel candidates overlapping in time.

The introduction of an overlapping candidate in the same RL in time allows the gNB (e.g. gNB 5 of FIG. 1) to schedule the UE faster, since there is no need for a UE to finish attempting to receive all control channels (control channel candidates) at a repetition level before attempting to receive further control channel candidates at that repetition level. This is further explained under reference to FIGS. 7a and 7b, wherein in FIG. 7a a PDCCH search space 11 is illustrated where no time overlapped PDCCH candidates of the seven candidates C1, C2, C3, C4, C5, C6, C8 in the same RL are present, whereas in FIG. 7b, a PDCCH search space 12 is illustrated having eight PDCCH candidates C1 to C8, wherein a time overlapping candidate C7 for RL=2 is provided. If a URLLC packet arrives at time $t_1$ and if the gNB requires a PDCCH with 2× repetitions to meet the required reliability, in the PDCCH search space 11 without time overlapped candidates in the same Rl, as illustrated in FIG. 7a, the gNB will have to schedule the PDCCH at time $t_3$ using candidate C6. On the other hand, in the PDCCH search space 12 with time overlapped candidate C7 in the same RL, as illustrated in FIG. 7b, the gNB can schedule this PDCCH earlier at time $t_2$ using the time overlapped candidate C7, thereby reducing the latency in transmitting the URLLC packet. It should be appreciated that the PDCCH search spaces 10 and 12 with time overlapped candidates of the same RL, as illustrated in FIG. 6 and FIG. 7b, are just example search spaces and other arrangements of candidates with different numbers of RLs are possible and implemented in some embodiments.

In some embodiments, the PDCCH search space is physically located in a Control Resource Set (CORESET), which consists of or includes physical resources. A CORESET may span {1, 2, 3} OFDM symbols. Hence, the repetition of the PDCCH may be performed in several ways, e.g. by repeating over different CORESETs or extending the CORESET in time. For instance, if there are 4× repetitions, the CORESET will be extended from {1, 2, 3} OFDM symbols to {4, 8, 12} OFDM symbols. At least some embodiments of the present disclosure are independent of how the repetition and CORESET are arranged. In the following description, without limiting the present disclosure in that regard, the time occupied by a PDCCH repetition is referred to as a "time unit", wherein a time unit can be a symbol, or one or more symbols corresponding to the symbols within a CORESET. Here, for example in FIGS. 7a and 7b, there are 4× repetitions of the PDCCH for C8 and each of those repetitions is mapped to a time unit. That is, the $1^{st}$ PDCCH repetition is mapped in a time unit between to and $t_1$, the $2^{nd}$ PDCCH repetition is mapped in a time unit between $t_1$ and $t_2$, the $3^{rd}$ PDCCH repetition is mapped in a time unit between $t_2$ and $t_3$, and the $4^{th}$ PDCCH repetition is mapped in a time unit between $t_3$ and $t_4$.

As indicated above and in connection with FIGS. 6 and 7b, in some embodiments, the PDCCH candidates that overlap in time belong to the same search space.

Figure 8:
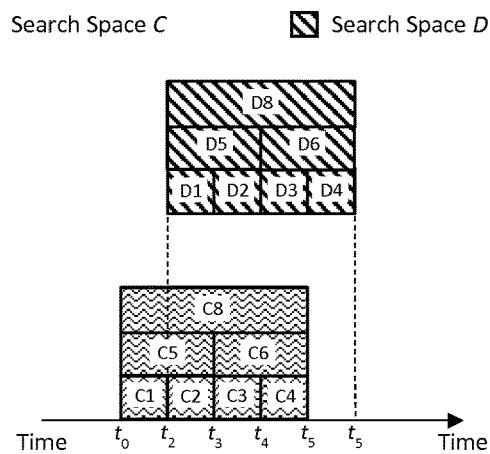
FIG. 8 illustrates different search spaces overlapping in time.

However, in some embodiments, the PDCCH candidates that overlap in time belong to different search spaces (where these different search spaces are monitored by the UE), as will be explained under reference of FIG. 8, wherein the different search spaces can be in the same CORESET or the can be in different CORESETs. As illustrated in FIG. 8, there are two PDCCH search spaces, namely a search space C with PDCCH candidates {C1, C2, C3, C4, C5, C6, C8} and a search space D with PDCCH candidates (D1, D2, D3, D4, D5, D6, D8). Within each of the search spaces C and D, no time overlapped candidates at the same RL are provided, but candidates from different search spaces overlap in time at the same RL, namely the candidate D5 at RL=2 of search space D overlaps in time with the candidates C5 and C6 at RL=2 of the search space C in the present embodiment.

As also discussed above, in some embodiments, the UE needs to perform blind decoding several times within a PDCCH search space and decoding points where the UE performs such blind decoding may be up to UE implementation.

In some embodiments, blind decoding is performed by the UE at the end of each PDCCH candidate, as will be explained under reference of FIG. 9. For instance, at time $t_2$, candidates C2 and C5 have ended and an attempt on decoding a PDCCH is made. If the UE detects a PDCCH, this may not only result from candidates that have completed their transmission, such as candidates C2 and C5, but also from candidates that have not completed their transmission, e.g. candidates C7 or C8, since it is possible in some embodiments for the UE to early detect a PDCCH repetition before its repetition is completed. Hence, the timing of the PDCCH, e.g. where it ends or when it started is important in some embodiments, since it can be used as a reference point as to where the PDSCH or PUSCH would start. In eMTC, for example, the issue of identifying the candidate that carries the PDCCH is solved by indicating the number of PDCCH repetitions in the DCI (downlink control information). For example, assuming a case where the time overlapped candidate C7 (which does not exist in eMTC) is ignored, at time $t_2$ of FIG. 9, if the PDCCH indicates that the number of PDCCH repetitions is two, the UE will know that the candidate that carries the PDCCH is C5.

However, as implemented in some embodiments, if the time overlapping candidate C7 is not ignored, it follows that the knowledge about the number of repetitions of the PDCCH alone is not sufficient for the UE to determine whether the PDCCH is carried by the candidate C5 or C7, since both of them have 2× repetitions.

Therefore, in another embodiment, the DCI also indicates the starting time of the $1^{st}$ PDCCH repetition. This indicator is provided in some embodiments in a new or additional field in the DCI. Examples of this starting time are (without liming the present disclosure in that regard):
  Relative to the start of the search space, e.g. referring to example in FIG. 9, 2 bits are required to indicate the starting PDCCH position at time {to, $t_1$, $t_2$, $t_3$};
  The mini-slot or OFDM symbol within a slot.

Figure 9:
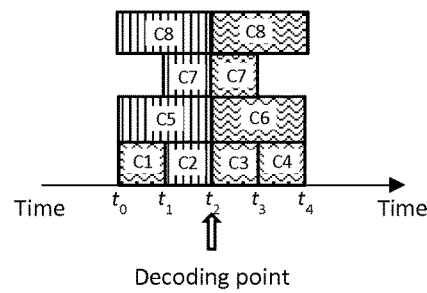
FIG. 9 illustrates a decoding point of overlapping control channel candidates.

Again referring back to the example in FIG. 9, by indicating that the PDCCH repetition equals two, the UE would narrow down the possible candidates to C5 and C7 and if the starting time is indicated as $t_1$, the UE would therefore be able to determine that the candidate carrying the PDCCH is C7, such that detection of this PDCCH is improved by removing ambiguity as to which of the PDCCH candidates carries the DCI in some embodiments. Knowing the repetition and the start time, the UE would be able to determine that start and end time of the PDCCH. Any timing of other channels or procedures that are relative to the start or end time of the PDCCH would then be unambiguous.

In another embodiment, the starting time of the PDCCH is implicitly indicated using an RNTI (radio network temporary identifier). The CRC (cyclic redundancy check) is masked/scrambled (XOR) with an RNTI of equal length (to the CRC) and this is used by the UE to identify whether the DCI is intended for it. In this embodiment, a different RNTI is used for each different starting time. In another embodiment, only a different RNTI is used for candidates having the same RL that overlap in time.

In another embodiment, the DCI indicates the frequency and time resources used by the PDCCH, wherein this indication may be a Resource Indication Value (RIV) for the PDCCH derived from the starting resources and the length of resources either in time domain or frequency domain. In legacy systems such as LTE, the RIV is a field in the grant which tells the UE which frequency resource PRB (physical resource block) is scheduled for a PDSCH or for a PUSCH. In another embodiment, the RNTI, which is used to mask the CRC of the DCI, is a function of this RIV.

Figure 10:
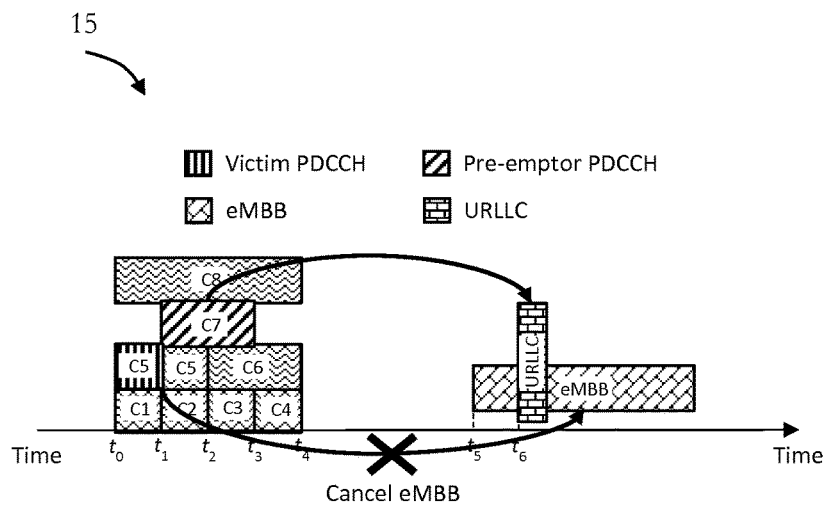
FIG. 10 illustrates pre-empting for overlapping control channel candidates.

In another embodiment, a first PDCCH transmitted using a candidate can pre-empt a second PDCCH transmitted using another candidate that overlaps in time, as is exemplary also illustrated in FIG. 10. This can be used, for example, when pre-empting a scheduled eMBB transmission with a URLLC transmission for the same UE, as shown on the right side of FIG. 10. The pre-emption can occur within the same UE (the eMBB transmission and URLLC transmission can be for the same UE). For example, as can be taken from FIG. 10, a PDCCH search space 15 is monitored by a UE at time to. The gNB (such as gNB 5 of FIG. 1) firstly schedules a PDSCH for an eMBB transmission with a DL grant carried by a first PDCCH using candidate C5 (with 2× repetitions). Right after that, a URLLC packet arrives in which the gNB needs to schedule immediately with another DL grant using a PDCCH with 2× repetitions. Instead of firstly waiting for the PDCCH repetitions using candidate C5 to be complete, the gNB transmits a second PDCCH using candidate C7 which pre-empts the first PDCCH (that had used candidate C5 (used for scheduling the eMBB transmission)). The second PDCCH is used to schedule a PDSCH for a URLLC transmission at time $t_6$. Hence, by allowing PDCCH candidates to be pre-empted or to be used for pre-empting already scheduled resources, the gNB can schedule a URLLC packet with low latency. In this example, the eMBB transmission is cancelled in response to having received and processed the second PDCCH candidate C7 indication, the second PDCCH being used for scheduling the URLLC transmission pre-empting the eMBB transmission. If the UE decodes a PDCCH carrying a DCI from a candidate, it will hence continue to attempt to decode further candidates within the same search space and will take action based on the decoded DCIs.

Figure 11:
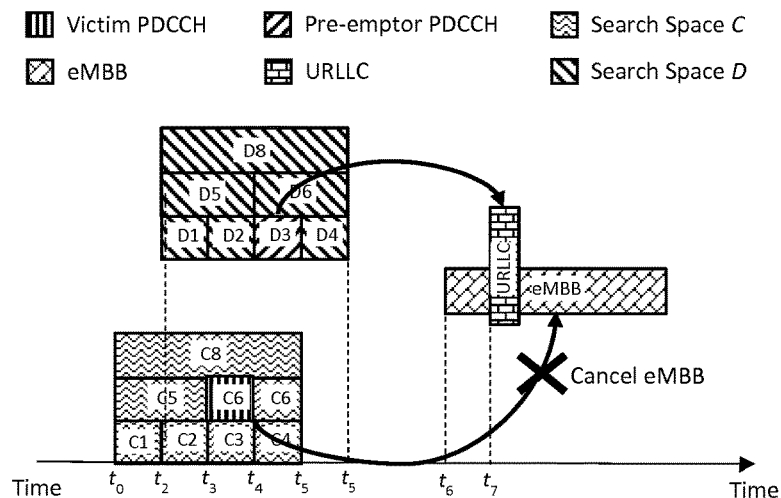
FIG. 11 illustrates pre-empting for overlapping search spaces.

Similarly, such embodiments are also applicable for the case where the pre-emptor PDCCH is from another search space as illustrated in FIG. 11. Here a first PDCCH scheduling an eMBB PDSCH is transmitted using candidate C6 of a search space C and a second PDCCH scheduling a URLLC PDSCH is transmitted using candidate D3 of a search space D, wherein the second PDCCH pre-empts the first PDCCH.

In the embodiment of FIG. 10, it is feasible that the UE early detects the first PDCCH candidate transmitted using candidate C5 at time $t_1$ even though the gNB may stop transmitting a PDCCH on candidate C5 after time $t_1$. The UE will therefore receive two grants that schedule conflicting resources, i.e. resources that overlap. Therefore, in another embodiment, when the UE receives two DCI's with conflicting DL (or UL) grants (i.e. grants that schedule overlapping resources), the UE obeys the later grant. With respect to the example of FIG. 10, this means that the UE will obey the DL grant transmitted using candidate C7 because candidate C7 arrives later than candidate C5. Of course, in the case where there are no conflicting grants, the UE can obey both grants. In some embodiments, the definition of the "later grant" depends on the start time of the transmission of its PDCCH. Hence, in FIG. 10, C2 is a "later grant" than C8 because C2 starts at time $t_1$ and C8 starts at time to, where $t_1 > t_0$. Even if the UE decoded C8 at time $t_4$ (and C2 at time $t_2$), C2 is the "later grant".

In another embodiment, when a UE receives two DCI's with conflicting grants, the DCI will indicate the priority of the (DL or UL) grant. Referring exemplary to FIG. 10, the DCI in the first PDCCH carried by candidate C5 can indicate a low priority while the DCI in the second PDCCH carried by candidate C7 can indicate a high priority. The UE will then discard the first PDCCH with the lower priority. The priority can be indicated in some embodiments based on at least one of the following:

Using a new priority field in the DCI, e.g. a 1 bit indicator to indicate "High" or "Low" priority
Using a different RNTI for high priority and lower priority
Some PDCCH candidates have higher priority than other PDCCH candidates In another embodiment, PDCCH search spaces are given different priorities. Hence, when a UE receives two DCI's with conflicting grants and the DCI's are transmitted using PDCCH candidates belonging to different PDCCH search spaces, the UE obeys the DCI that belongs to a higher priority search space. The priority of the search space can be RRC configured. Referring exemplary to FIG. 11, the search space D is configured with a higher priority than the search space C and therefore the UE will obey the DCI carried by PDCCH candidate D3 of search space D since candidate D3 of search space D has a higher priority than the DCI carried by PDCCH candidate C6 of search space C.

In another embodiment, the duration of the PDCCH search space $T_{ss}$, may not be equal to the maximum repetitions of PDCCH candidates. In the conventional search space, as discussed above, the length in time of the PDCCH search space is always equal to the maximum repetition, e.g. in FIG. 5, the length of the PDCCH search space $T_{ss}=R_4$, which is also the maximum repetition. In other words, the conventional PDCCH search space typically has only one occurrence of a PDCCH candidate with the maximum repetition (note there can of course be multiple candidates with max repetition but different Aggregation Levels).

Figure 12:
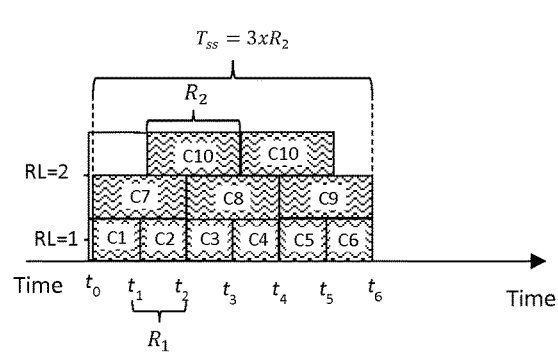
FIG. 12 illustrates a search space being larger than a maximum repetition of control channel candidates.

In this embodiment, the PDCCH search space is allowed to have multiple occurrences of the maximum repetitions, as is exemplary shown in FIG. 12, where the maximum repetition is $R_2$ and the duration of the PDCCH search space $T_{ss}=3\times R_2$. Here, five occurrences of PDCCH candidates with repetition $R_2$ are exemplary illustrated. This is beneficial for URLLC transmission in this embodiment, since it can extend a search space to cover a slot without increasing the maximum PDCCH repetition.

Figure 13:
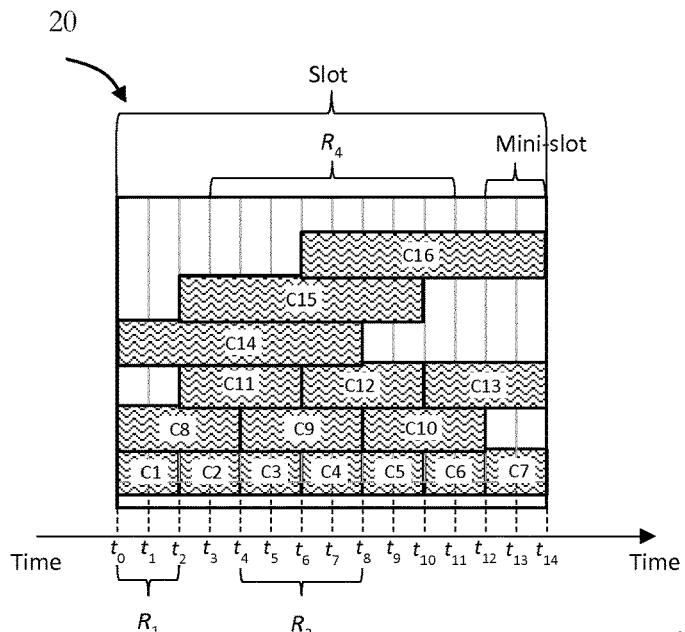
FIG. 13 illustrates a search space having mini slots.

For example, as illustrated in FIG. 13, there is a PDCCH search space 20 with sixteen candidates (assuming each repetition we have 1 candidate) and repetitions $\{R_1, R_2, R_4\}$ where $R_4$ is the maximum repetition. Each PDCCH occupies a mini-slot or two OFDM symbols and here a slot is fourteen OFDM symbols or seven mini-slots. The duration of the PDCCH search space $T_{ss}=1$ slot, which allows a PDCCH candidate to occur at every mini-slot, as illustrated in FIG. 13, thereby ensuring that the gNB has the opportunity to schedule the UE at every mini-slot. In this embodiment, this arrangement allows that $T_{ss}>R_4$ (max repetition). It should be appreciated that the example in FIG. 12 and FIG. 13 are two arrangements where $T_{ss}>$max repetition and other arrangements are feasible and implemented in other embodiments.

Figure 14:
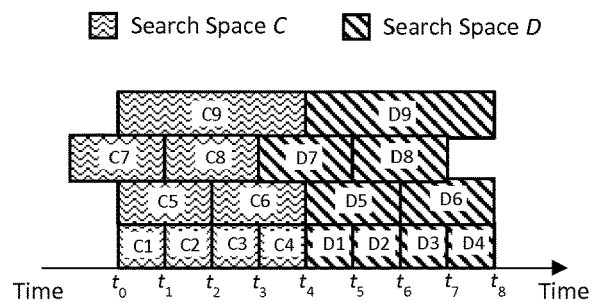
FIG. 14 illustrates two search spaces adjacent to each other.

In another embodiment, as illustrated in FIG. 14, some candidates in one PDCCH search space C is allowed to overlap with candidates in another PDCCH search space D, wherein the search space C has candidates {C1, C2, C3, C4, C5, C6, C7, C8, C9} and search space D has candidates {D1, D2, D3, D4, D5, D6, D7, D8, D9} and wherein the search spaces C and D are arranged adjacent to each other in a time direction. The candidate D7 of search space D overlaps with candidates {C4, C6, C9} of search space C having the same repetition level. In this embodiment, the overlapping candidate D7 starts earlier than the other candidates of the search space D. In this manner, the search spaces C and D are combined such that they maximize the scheduling opportunity for the gNB, e.g. by avoiding time intervals between the search spaces in which no candidates (with repetition >1) are located.

The search space C and search space D in FIG. 14, can each be a search space that occurs periodically, where search space C is one instance in time and D is another instance of the same periodically occurring search space.

The combination of search space C and search space D in FIG. 14 can be repeated periodically in time, in some embodiments. For example, the combination of search spaces C and D can be repeated (in a periodic fashion), such that candidate C7 also occurs at time $t_8$ and candidates C1, C5, C9 start at a time later than t&.

In another embodiment, the number of Aggregation Levels reduces as the number of repetitions increases. This would reduce the number of blind decodes a UE needs to do. For example, when repetition is 2×, AL=1 and AL=2 are not present but only AL={4, 8, 16} are available, that is there are no candidates with 2× repetitions and AL=1 or AL=2. If the number of candidates for AL={1, 2, 4, 8, 16} are {16, 8, 4, 2, 1} respectively, then if no reduction in AL is done, 16+8+4+2+1=31 candidates are provided for each repetition level. If AL=1 and AL=2 are removed, the number of blind decodes is reduced from 31 to 7.

As discussed above, in some embodiments, a PDCCH search space with repetitive candidates is provided and used in eMTC and NB-IoT. In contrast to known PDCCH candidate arrangement within the search space, at least some of the embodiments provide low latency operations such as that in URLLC.

Figure 15:
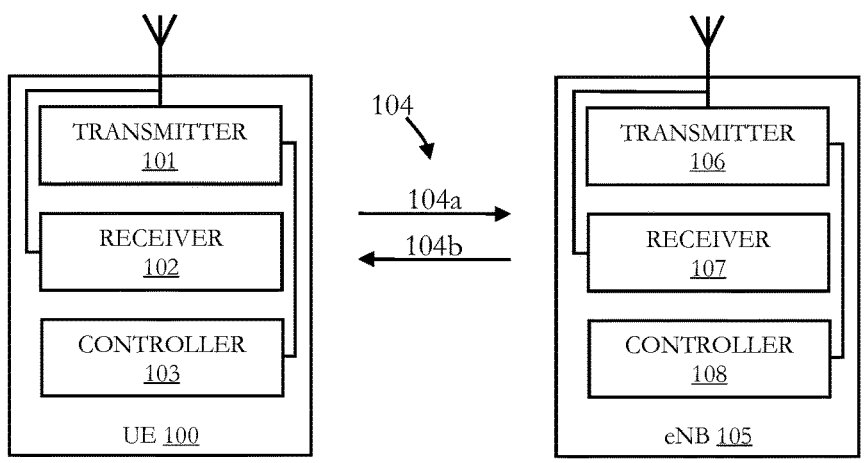
FIG. 15 illustrates an embodiment of a user equipment and a base station.

An embodiment of a UE 100 and an eNB 105 (or NR eNB/gNB) and a communications path 104 between the UE 100 and the eNB 105, which are used for implementing embodiments of the present disclosure, is discussed under reference of FIG. 15.

The UE 100 has a transmitter 101, a receiver 102 and a controller 103, wherein, generally, the technical functionality of the transmitter 101, the receiver 102 and the controller 103 are known to the skilled person, and, thus, a more detailed description of them is omitted.

The eNB 105 has a transmitter 106, a receiver 107 and a controller 108, wherein also here, generally, the functionality of the transmitter 106, the receiver 107 and the controller 108 are known to the skilled person, and, thus, a more detailed description of them is omitted.

The communication path 104 has an uplink path 104a, which is from the UE 100 to the eNB 105, and a downlink path 104b, which is from the eNB 105 to the UE 100.

During operation, the controller 103 of the UE 100 controls the reception of downlink signals over the downlink path 104b at the receiver 102 and the controller 103 controls the transmission of uplink signals over the uplink path 104a via the transmitter 101.

Similarly, during operation, the controller 108 of the eNB 105 controls the transmission of downlink signals over the downlink path 104b over the transmitter 106 and the controller 108 controls the reception of uplink signals over the uplink path 104a at the receiver 107.

Figure 16:
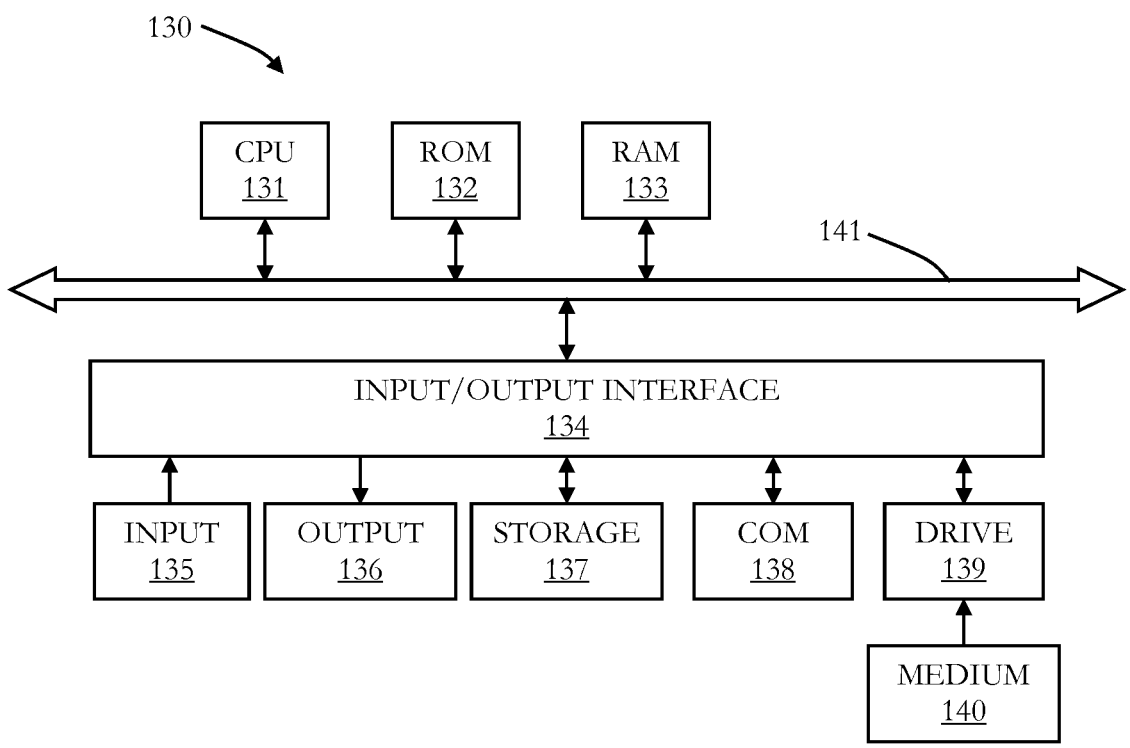
FIG. 16 illustrates a multi-purpose computer which can be used for implementing a user equipment or a base station.

In the following, an embodiment of a general purpose computer 130 is described under reference of FIG. 16. The computer 130 can be implemented such that it can basically function as any type of base station or new radio base station, transmission and reception point, or user equipment as described herein. The computer has components 131 to 141, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor and/or circuitry, such as the processor and/or circuitry described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality 2s provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure. Note that the present technology can also be configured as described below.

(1) A base station for a mobile telecommunications system comprising circuitry configured to communicate with at least one user equipment, wherein the circuitry is further configured to:
provide, to the at least one user equipment, control channel candidates at different repetition levels, wherein at least a first control channel candidate of a repetition level overlaps in time with at least a second control channel candidate of the same repetition level.

(2) The base station of (1), wherein the control channel candidates are associated with physical downlink control channels.

(3) The base station of (1) or (2), wherein time overlapping control channel candidates having the same repetition level are associated with the same control channel search space.

(4) The base station of anyone of (1) to (4), wherein time overlapping control channel candidates having the same repetition level are associated with different control channel search spaces.

(5) The base station of anyone of (1) to (4), wherein a starting time for at least one control channel of the control channel candidates is explicitly indicated.

(6) The base station of (5), wherein the circuitry is further configured to transmit a starting time indicator for at least one control channel of the control channel candidates.

(7) The base station of (6), wherein the starting time indicator is transmitted in downlink control information.

(8) The base station of anyone of (1) to (7), wherein a starting time for at least one control channel of the control channel candidates is implicitly indicated.

(9) The base station of (8), wherein a radio network temporary identifier implicitly indicates the starting time.

(10) The base station of (9), wherein different radio network temporary identifiers implicitly indicate different starting times for different control channels.

(11) The base station of anyone of (1) to (10), wherein frequency and time resources are indicated, which are used by a control channel, wherein the indication is based on a resource indication value for the control channel.

(12) The base station of anyone of (1) to (11), wherein a third control channel candidate is associated with a first control channel transmission for a user equipment and a fourth control channel candidate is associated with a second control channel transmission for the user equipment, and wherein the second control channel transmission associated with the fourth control channel candidate pre-empts the first control channel transmission.

(13) The base station of (12), wherein the second control channel transmission associated with the fourth control channel candidate is to be transmitted after the first control channel transmission associated with the third control channel candidate.

(14) The base station of anyone of (1) to (13), wherein a priority is indicated for a control channel associated with a control channel candidate.

(15) The base station of (14), wherein the priority is included in downlink control information.

(16) The base station of (14), wherein the priority is indicated based on a radio network temporary identifier.

(17) The base station of anyone of (1) to (16), wherein control channels have predetermined priorities.

(18) The base station of anyone of (1) to (17), wherein control channel search spaces have predetermined priorities.

(19) The base station of anyone of (1) to (18), wherein priorities of control channel search spaces are radio resource control configured.

(20) The base station of anyone of (1) to (19), wherein a control channel search space is larger in a time direction than a maximum length of a control channel candidate.

(21) The base station of anyone of (1) to (20), wherein at least two occurrences of a control channel search space are arranged adjacent to each other in a time direction, wherein at least one of the control channel candidates in the first occurrence of the control channel search space overlaps the starting time of the second occurrence of the control channel search space.

(22) The base station of anyone of (1) to (21), wherein the number of aggregation levels is indirectly proportional to the number of repetitions of control channel candidates.

(23) A user equipment for a mobile telecommunications system comprising circuitry configured to communicate with at least one base station, wherein the circuitry is further configured to:
receive, from the at least one base station, at least one control channel from control channel candidates at different repetition levels, wherein at least a first control channel candidate of a repetition level overlaps in time with at least a second control channel candidate of the same repetition level.

(24) The user equipment of (23), wherein the control channel candidates are associated with physical downlink control channels.

(25) The user equipment of (23) or (24), wherein time overlapping control channel candidates having the same repetition level are associated with the same control channel search space.

(26) The user equipment of anyone of (23) to (25), wherein time overlapping control channel candidates having the same repetition level are associated with different control channel search spaces.

(27) The user equipment of anyone of (23) to (26), wherein a starting time for at least one control channel of the control channel candidates is explicitly indicated.

(28) The user equipment of (27), wherein the circuitry is further configured to receive a starting time indicator for at least one control channel of the control channel candidates.

(29) The user equipment of (28), wherein the starting time indicator is transmitted in downlink control information.

(30) The user equipment of anyone of (23) to (29), wherein a starting time for at least one control channel of the control channel candidates is implicitly indicated.

(31) The user equipment of (30), wherein a radio network temporary identifier implicitly indicates the starting time.

(32) The user equipment of (31), wherein different radio network temporary identifiers implicitly indicate different starting times for different control channels.

(33) The user equipment of anyone of (23) to (32), wherein frequency and time resources are indicated, which are used by a control channel, wherein the indication is based on a resource indication value for the control channel.

(34) The user equipment of anyone of (23) to (33), wherein a third control channel candidate is associated with a first control channel transmission for a user equipment and a fourth control channel candidate is associated with a second control channel transmission for the user equipment, and wherein the second control channel transmission associated with the fourth control channel candidate pre-empts the first control channel transmission.

(35) The user equipment of (34), wherein the second control channel transmission associated with the fourth control channel candidate is to be transmitted after the first control channel transmission associated with the third control channel.

(36) The user equipment of anyone of (23) to (35), wherein a priority is indicated for a control channel associated with a control channel candidate.

(37) The user equipment of (36), wherein the priority is included in downlink control information.

(38) The user equipment of (36), wherein the priority is indicated based on a radio network temporary identifier.

(39) The user equipment of anyone of (23) to (38), wherein control channels have predetermined priorities.

(40) The user equipment of anyone of (23) to (39), wherein control channel search spaces have predetermined priorities.

(41) The user equipment of anyone of (23) to (40), wherein priorities of control channel search spaces are radio resource control configured.

(42) The user equipment of anyone of (23) to (41), wherein a control channel search space is larger in a time direction than a maximum length of a control channel candidate.

(43) The user equipment of anyone of (23) to (42), wherein at least two occurrences of a control channel search space are arranged adjacent to each other in a time direction, wherein at least one of the control channel candidates in the first occurrence of the control channel search space overlaps the starting time of the second occurrence of the control channel search space.

(44) The user equipment of anyone of (23) to (43), wherein the number of aggregation levels is indirectly proportional to the number of repetitions of control channel candidates.

(45) A circuitry for a mobile telecommunications system configured to communicate with at least another circuitry, wherein the circuitry is further configured to:

provide, to the at least another circuitry, control channel candidates at different repetition levels, wherein at least a first control channel candidate of a repetition level overlaps in time with at least a second control channel candidate of the same repetition level, or receive, from the at least another circuitry, at least one control channel from control channel candidates at different repetition levels, wherein at least a first control channel candidate of a repetition level overlaps in time with at least a second control channel candidate of the same repetition level.

(46) The circuitry of (45), wherein the control channel candidates are associated with physical downlink control channels.

(47) The circuitry of (45) or (46), wherein time overlapping control channel candidates having the same repetition level are associated with the same control channel search space.

(48) The circuitry of anyone of (45) to (47), wherein time overlapping control channel candidates having the same repetition level are associated with different control channel search spaces.

(49) The circuitry of anyone of (45) to (48), wherein a starting time for at least one control channel of the control channel candidates is explicitly indicated.

(50) The circuitry of (49), wherein the circuitry is further configured to transmit or receive a starting time indicator for at least one control channel of the control channel candidates.

(51) The circuitry of (50), wherein the starting time indicator is transmitted in downlink control information.

(52) The circuitry of anyone of (45) to (51), wherein a starting time for at least one control channel of the control channel candidates is implicitly indicated.

(53) The circuitry of (52), wherein a radio network temporary identifier implicitly indicates the starting time.

(54) The circuitry of (53), wherein different radio network temporary identifiers implicitly indicate different starting times for different control channels.

(55) The circuitry of anyone of (45) to (54), wherein frequency and time resources are indicated, which are used by a control channel, wherein the indication is based on a resource indication value for the control channel.

(56) The circuitry of anyone of (45) to (55), wherein a third control channel candidate is associated with a first control channel transmission for a user equipment and a fourth control channel candidate is associated with a second control channel transmission for the user equipment, and wherein the second control channel transmission associated with the fourth control channel candidate pre-empts the first control channel transmission.

(57) The circuitry of (56), wherein the second control channel transmission associated with the fourth control channel is to be transmitted after the first control channel transmission associated with the third control channel.

(58) The circuitry of anyone of (45) to (57), wherein a priority is indicated for a control channel associated with a control channel candidate.
(59) The circuitry of (58), wherein the priority is included in downlink control information.
(60) The circuitry of (58), wherein the priority is indicated based on a radio network temporary identifier.
(61) The circuitry of anyone of (45) to (60), wherein control channels have predetermined priorities.
(62) The circuitry of anyone of (45) to (61), wherein control channel search spaces have predetermined priorities.
(63) The circuitry of anyone of (45) to (62), wherein priorities of control channel search spaces are radio resource control configured.
(64) The circuitry of anyone of (45) to (63), wherein a control channel search space is larger in a time direction than a maximum length of a control channel.
(65) The circuitry of anyone of (45) to (64), wherein at least two occurrences of a control channel search space are arranged adjacent to each other in a time direction, wherein at least one of the control channel candidates in the first occurrence of the control channel search space overlaps the starting time of the second occurrence of the control channel search space.
(66) The circuitry of anyone of (45) to (65), wherein the number of aggregation levels is indirectly proportional to the number of repetitions of control channel candidates.
(67) A mobile telecommunications system method for providing communication between at least one base station and at least one user equipment, comprising:
providing, to the at least one user equipment, control channel candidates at different repetition levels, wherein at least a first control channel candidate of a repetition level overlaps in time with at least a second control channel candidate of the same repetition level, or
receiving, from the at least one base station, at least one control channel from control channel candidates at different repetition levels, wherein at least a first control channel candidate of a repetition level overlaps in time with at least a second control channel candidate of the same repetition level.
(68) The method of (67), wherein the control channel candidates are associated with physical downlink control channels.
(69) The method of (67) or (68), wherein time overlapping control channel candidates having the same repetition level are associated with the same control channel search space.
(70) The method of anyone of (67) to (69), wherein time overlapping control channel candidates having the same repetition level are associated with different control channel search spaces.
(71) The method of anyone of (67) to (70), wherein a starting time for at least one control channel of the control channel candidates is explicitly indicated.
(72) The method of (71), wherein the method is further configured to transmit or receive a starting time indicator for at least one control channel of the control channel candidates.
(73) The method of (72), wherein the starting time indicator is transmitted in downlink control information.
(74) The method of anyone of (67) to (73), wherein a starting time for at least one control channel of the control channel candidates is implicitly indicated.
(75) The method of (74), wherein a radio network temporary identifier implicitly indicates the starting time.
(76) The method of (75), wherein different radio network temporary identifiers implicitly indicate different starting times for different control channels.
(77) The method of (76), wherein frequency and time resources are indicated, which are used by a control channel, wherein the indication is based on a resource indication value for the control channel.
(78) The method of anyone of (67) to (77), wherein a third control channel candidate is associated with a first control channel transmission for a user equipment and a fourth control channel candidate is associated with a second control channel transmission for the user equipment, and wherein the second control channel transmission associated with the fourth control channel candidate pre-empts the first control channel transmission.
(79) The method of (78), wherein the second control channel transmission associated with the fourth control channel is to be transmitted after the first control channel transmission associated with the third control channel.
(80) The method of anyone of (67) to (79), wherein a priority is indicated for a control channel associated with a control channel candidate.
(81) The method of (80), wherein the priority is included in downlink control information.
(82) The method of (80), wherein the priority is indicated based on a radio network temporary identifier.
(83) The method of anyone of (67) to (82), wherein control channels have predetermined priorities.
(84) The method of anyone of (67) to (83), wherein control channel search spaces have predetermined priorities.
(85) The method of anyone of (67) to (84), wherein priorities of control channel search spaces are radio resource control configured.
(86) The method of anyone of (67) to (85), wherein a control channel search space is larger in a time direction than a maximum length of a control channel candidate.
(87) The method of anyone of (67) to (86), wherein at least two occurrences of a control channel search space are arranged adjacent to each other in a time direction, wherein at least one of the control channel candidates in the first occurrence of the control channel search space overlaps the starting time of the second occurrence of the control channel search space.
(88) The method of anyone of (67) to (87), wherein the number of aggregation levels is indirectly proportional to the number of repetitions of control channel candidates.
(89) A mobile telecommunications system configured to provide communication between at least one base station and at least one user equipment, wherein
the at last one base station comprises circuitry configured to provide, to the at least one user equipment, control channel candidates at different repetition levels, wherein at least a first control channel candidate of a repetition level overlaps in time with at least a second control channel candidate of the same repetition level, and wherein
the at least one user equipment comprises circuitry configured to receive, from the at least one base station, at least one control channel from control channel candidates at different repetition levels, wherein at least a first control channel candidate of a repetition level overlaps in time with at least a second control channel candidate of the same repetition level.

The invention claimed is:

1. A base station for a mobile telecommunications system comprising circuitry configured to:
   communicate with at least one user equipment;
   provide, to the at least one user equipment, control channel candidates at different repetition levels; and
   provide an indication of a repetition level for at least a first control channel candidate to the at least one user equipment via downlink control information (DCI),
   wherein at least the first control channel candidate of the repetition level overlaps in time with at least a second control channel candidate of the same repetition level,
   wherein time overlapping control channel candidates having the same repetition level are associated with different control channel search spaces.

2. The base station of claim 1, wherein the control channel candidates are associated with physical downlink control channels.

3. The base station of claim 1, wherein time overlapping control channel candidates having the same repetition level are associated with the same control channel search space.

4. The base station of claim 1, wherein a starting time for at least one control channel of the control channel candidates is explicitly indicated.

5. The base station of claim 4, wherein the circuitry is further configured to transmit a starting time indicator for at least one control channel of the control channel candidates.

6. The base station of claim 5, wherein the starting time indicator is transmitted in downlink control information.

7. The base station of claim 1, wherein a starting time for at least one control channel of the control channel candidates is implicitly indicated.

8. The base station of claim 7, wherein a radio network temporary identifier implicitly indicates the starting time.

9. The base station of claim 8, wherein different radio network temporary identifiers implicitly indicate different starting times for different control channels.

10. The base station of claim 1, wherein frequency and time resources are indicated, which are used by a control channel, wherein the indication is based on a resource indication value for the control channel.

11. The base station of claim 1, wherein a third control channel candidate is associated with a first control channel transmission for a user equipment and a fourth control channel candidate is associated with a second control channel transmission for the user equipment, and wherein the second control channel transmission associated with the fourth control channel candidate pre-empts the first control channel transmission.

12. The base station of claim 11, wherein the second control channel transmission associated with the fourth control channel candidate is to be transmitted after the first control channel transmission associated with the third control channel candidate.

13. The base station of claim 1, wherein a priority is indicated for a control channel associated with a control channel candidate.

14. The base station of claim 13, wherein the priority is included in downlink control information.

15. The base station of claim 13, wherein the priority is indicated based on a radio network temporary identifier.

16. The base station of claim 1, wherein control channels have predetermined priorities.

17. The base station of claim 1, wherein control channel search spaces have predetermined priorities.

18. The base station of claim 1, wherein priorities of control channel search spaces are radio resource control configured.

19. A mobile telecommunications system method for providing communication between at least one base station and at least one user equipment, comprising:
   providing, to the at least one user equipment, control channel candidates at different repetition levels;
   providing, to the at least one user equipment, an indication of a repetition level for at least a first control channel candidate via downlink control information (DCI); and
   receiving, by the at least one user equipment from the at least one base station, the control channel candidates at different repetition levels and the indication of the repetition level of at least the first control channel candidate,
   wherein at least the first control channel candidate of the repetition level overlaps in time with at least a second control channel candidate of the same repetition level,
   wherein time overlapping control channel candidates having the same repetition level are associated with different control channel search spaces.

* * * * *